US010639935B2

(12) United States Patent
Costlow et al.

(10) Patent No.: US 10,639,935 B2
(45) Date of Patent: May 5, 2020

(54) TIRE WITH TENSIONED SPOKES

(71) Applicant: Bridgestone Americas Tire Operations, LLC, Nashville, TN (US)

(72) Inventors: Douglas B. Costlow, Akron, OH (US); Andrew V. Haidet, Silver Lake, OH (US); Adam K. Nesbitt, Akron, OH (US); Sharon E. Reinhardt, Fairlawn, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 212 days.

(21) Appl. No.: 15/844,679

(22) Filed: Dec. 18, 2017

(65) Prior Publication Data

US 2018/0170107 A1    Jun. 21, 2018

Related U.S. Application Data

(60) Provisional application No. 62/437,313, filed on Dec. 21, 2016.

(51) Int. Cl.
*B60C 7/14*    (2006.01)
*B60B 1/04*    (2006.01)
(Continued)

(52) U.S. Cl.
CPC ............... *B60C 7/14* (2013.01); *B29D 30/02* (2013.01); *B60B 1/042* (2013.01); *B60B 5/02* (2013.01); *B60C 7/08* (2013.01); *B60C 7/143* (2013.01); *B60C 7/18* (2013.01); *B60B 2360/50* (2013.01); *B60B 2900/111* (2013.01); *B60C 2007/005* (2013.01); *B60C 2007/107* (2013.01)

(58) Field of Classification Search
CPC .. B60C 7/14; B60C 7/143; B60C 7/18; B60C 7/08; B60C 2007/107; B60C 2007/005; B29D 30/02; B60B 5/02; B60B 1/042; B60B 2360/50; B60B 2900/111
USPC ........................................................ 152/246
See application file for complete search history.

(56) References Cited

U.S. PATENT DOCUMENTS

| 4,782,875 A | 11/1988 | Jones |
| 6,170,544 B1 | 1/2001 | Hottebart |

(Continued)

FOREIGN PATENT DOCUMENTS

| JP | 2012234525 | 12/2012 |
| KR | 20130037808 | 4/2013 |

(Continued)

OTHER PUBLICATIONS https://ideaexchange.uakron.edu/cgi/viewcontent.cgi?referer=https://www.google.com/&httpsredir=1&article=1830&context=mechanical_ideas (Year: 2006).*

(Continued)

*Primary Examiner* — S. Joseph Morano
*Assistant Examiner* — Jean W Charleston
(74) *Attorney, Agent, or Firm* — Shaun J. Fox; Bryan Jaketic

(57) ABSTRACT

A nonpneumatic tire includes an upper ring and a plurality of spokes extending from the upper ring. At least one reinforcement embedded in each spoke, wherein each reinforcement is constructed of a material that shrinks in length by 0.1% to 10% when subjected to a temperature between 38° C. to 260° C. and a pressure between 0.10 mPa to 0.70 mPa.

20 Claims, 12 Drawing Sheets

(51) Int. Cl.
    *B60B 5/02*     (2006.01)
    *B29D 30/02*     (2006.01)
    *B60C 7/08*     (2006.01)
    *B60C 7/18*     (2006.01)
    *B60C 7/10*     (2006.01)
    *B60C 7/00*     (2006.01)

(56) References Cited

U.S. PATENT DOCUMENTS

| | | | |
|---|---|---|---|
| 7,013,939 B2 | 3/2006 | Rhyne | |
| 7,418,988 B2 | 9/2008 | Cron | |
| 7,631,947 B2 | 12/2009 | Mercat | |
| 7,950,747 B2 | 5/2011 | Mercat | |
| 8,491,981 B2 * | 7/2013 | Delfino | B32B 3/20 |
| | | | 152/302 |
| 8,646,497 B2 * | 2/2014 | Cron | B60O 7/18 |
| | | | 152/12 |
| 2012/0234444 A1 | 2/2012 | Palinkas | |
| 2013/0214586 A1 | 8/2013 | Kismarton | |
| 2014/0000777 A1 * | 1/2014 | Choi | B60O 7/18 |
| | | | 152/246 |
| 2014/0367007 A1 | 12/2014 | Thompson | |
| 2015/0174953 A1 * | 6/2015 | Cron | B60B 9/26 |
| | | | 152/11 |
| 2016/0257170 A1 * | 9/2016 | Sugiya | B60C 7/14 |
| 2017/0021673 A1 * | 1/2017 | Givens | B60C 11/00 |

FOREIGN PATENT DOCUMENTS

| | | |
|---|---|---|
| WO | 2008050503 | 5/2008 |
| WO | 2011025491 | 3/2011 |
| WO | 2012171055 | 12/2012 |
| WO | 2015058181 | 4/2015 |
| WO | 2015100080 | 7/2015 |
| WO | WO-2015100080 A1 * | 7/2015 |
| WO | 2017116823 | 7/2017 |
| WO | 2017116825 | 7/2017 |

OTHER PUBLICATIONS

Search Report; Corresponding European Patent Application No. EP17205687; Examiner Wolfgang Jung; dated Mar. 5, 2018.
Opinion; Corresponding European Patent Application No. EP17205687; Examiner Wolfgang Jung; dated Mar. 5, 2018.

* cited by examiner

TIRE WITH TENSIONED SPOKES

FIELD OF INVENTION

The present disclosure relates to a tire having spokes. More particularly, the present disclosure relates to a non-pneumatic tire having a plurality of spokes under a tensile stress.

BACKGROUND

Known pneumatic tires are constructed of one or more body plies turned up around a pair of bead portions. A circumferential belt and an optional cap ply are disposed above a crown region of the body plies. Tread rubber and sidewall rubber are disposed about the body plies to form a green tire. Additional inserts and reinforcements may be included at various locations to enhance tire performance under certain conditions. After the green tire is assembled it is cured in a vulcanization mold.

Non-pneumatic tire constructions enable a tire to run in an uninflated condition. Some non-pneumatic tires employ a unitary tire and wheel construction. Other non-pneumatic tires are fastened to wheels using fasteners such as bolts. Non-pneumatic tires may include spokes that buckle or deflect upon contact with the ground. Such spokes may be constructed of a material that is relatively stronger in tension than in compression, so that when the lower spokes buckle, the load can be distributed through the remaining portion of the wheel.

SUMMARY OF THE INVENTION

In one embodiment, a nonpneumatic tire includes a plurality of rubber layers having a substantially circular shape. Each rubber layer includes an upper ring defining a tread portion, and each rubber layer further includes a plurality of spoke portions extending from the upper ring. The tire also has a plurality of elongated reinforcements extending in a substantially radial direction. Each reinforcement is disposed between the spoke portions of adjacent rubber layers. Each reinforcement is constructed of a material that shrinks in length by 0.1% to 10% when subjected to a temperature between 38° C. to 260° C. and a pressure between 0.10 mPa to 0.70 mPa.

In another embodiment, a nonpneumatic tire and hub assembly includes a hub and a tire having an upper ring and a plurality of spokes extending between the upper ring and the hub. At least one reinforcement is embedded in each spoke, wherein each reinforcement is constructed of a material that shrinks in length by 0.1% to 10% when subjected to a temperature between 38° C. to 260° C. and a pressure between 0.10 mPa to 0.70 mPa.

In yet another embodiment, a nonpneumatic tire includes an upper ring and a plurality of spokes extending from the upper ring. At least one reinforcement embedded in each spoke, wherein each reinforcement is constructed of a material that shrinks in length by 0.1% to 10% when subjected to a temperature between 38° C. to 260° C. and a pressure between 0.10 mPa to 0.70 mPa.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
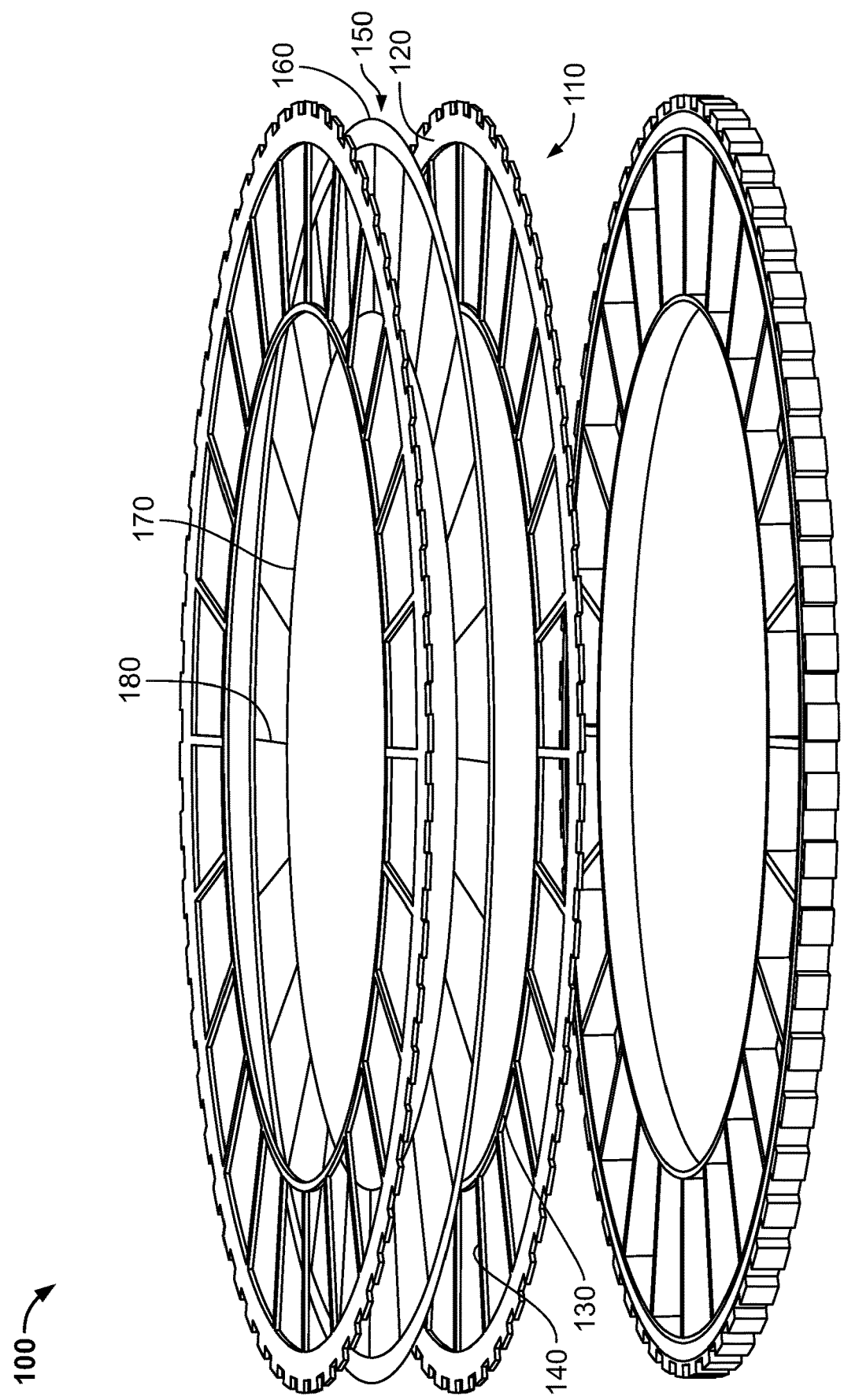
FIG. 1 illustrates an exploded view of one embodiment of a partially assembled non-pneumatic tire.

The following includes definitions of selected terms employed herein. The definitions include various examples and/or forms of components that fall within the scope of a term and that may be used for implementation. The examples are not intended to be limiting. Both singular and plural forms of terms may be within the definitions.

"3D printer" refers to a machine used for 3D printing.

"3D printing" refers to the fabrication of objects through the deposition of a material using a print head, nozzle, or another printer technology.

"Additive manufacturing" refers to a process of joining materials to make objects from 3D model data, usually layer upon layer, as opposed to subtractive manufacturing methodologies. Additive manufacturing includes 3D printing, binder jetting, directed energy deposition, fused deposition modeling, laser sintering, material jetting, material extrusion, powder bed fusion, rapid prototyping, rapid tooling, sheet lamination, and vat photopolymerization.

"Additive systems" refer to machines used for additive manufacturing.

"Axial" and "axially" refer to a direction that is parallel to the axis of rotation of a tire.

"Bead" refers to the part of the tire that contacts a wheel and defines a boundary of the sidewall.

"Circumferential" and "circumferentially" refer to a direction extending along the perimeter of the surface of the tread perpendicular to the axial direction.

"Equatorial plane" refers to the plane that is perpendicular to the tire's axis of rotation and passes through the center of the tire's tread.

"Radial" and "radially" refer to a direction perpendicular to the axis of rotation of a tire.

"Sidewall" refers to that portion of the tire between the tread and the bead.

"Spoke" refers to one or more bars, rods, webbing, mesh, or other connecting member extending from a lower member to an upper member. A spoke may include a solid sheet of material.

"Subtractive manufacturing" refers to making objects by removing of material (for example, buffing, milling, drilling, grinding, carving, cutting, etc.) from a bulk solid to leave a desired shape, as opposed to additive manufacturing.

"Tread" as used herein, refers to that portion of the tire that comes into contact with the road or ground under normal inflation and normal load.

"Tread width" refers to the width of the ground contact area of a tread which contacts with road surface during the rotation of the tire under normal inflation and load.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

While similar terms used in the following descriptions describe common tire components, it should be understood that because the terms carry slightly different connotations, one of ordinary skill in the art would not consider any one of the following terms to be purely interchangeable with another term used to describe a common tire component.

FIG. 1 illustrates an exploded view of one embodiment of a partially assembled non-pneumatic tire 100. The non-pneumatic tire 100 includes a plurality of sheets of polymeric material 110 having a substantially circular shape. In this particular embodiment, each sheet of polymeric material includes an upper ring 120, a lower ring 130, and a plurality of spoke portions 140 extending from the upper ring 120 to the lower ring 130. In an alternative embodiment (not shown), not every sheet of polymeric material includes an upper ring, a lower ring, and a plurality of spoke portions. In one such example, some sheets include an upper ring, a lower ring, and a plurality of spoke portions, while other sheets omit the spoke portion or the lower ring. In another example, some sheets omit the upper ring.

In the illustrated embodiment, the upper ring 120 of each sheet includes a tread portion. The tread portion is shaped to form a tread design. In the illustrated embodiment, the tread portion forms a tread design having a plurality of rectangular tread blocks separated by a plurality of lateral grooves. In alternative embodiments (not shown), the tread portion may form a tread design having ribs, circumferential grooves, sipes, or tread blocks of various shapes and sizes. The tread may be symmetric or asymmetric.

In the illustrated embodiment, each sheet of polymeric material includes 24 spoke portions. In alternative embodiments, each sheet of polymeric material may have any number of spoke portions. In some examples, each sheet of polymeric material has 10-40 spoke portions.

In the illustrated embodiment, each sheet of polymeric material 110 has the same number of spoke portions 140. Additionally, each spoke portion 140 in each sheet 110 has substantially the same shape and size. Further, the spoke portions 140 of adjacent sheets 110 are aligned with each other. However, it should be understood that in alternative embodiments, some sheets may have a different number of spoke portions. Additionally, in other alternative embodiments, the sizes and shapes of the spoke portions on a given sheet may vary. Likewise, in still other alternative embodiment, the spoke portions on a given sheet may have different sizes and shape with respect to the spoke portions on another sheet. Moreover, the spoke portions of different sheets may not be aligned with each other.

In one embodiment, each sheet of polymeric material is constructed of green rubber. In an alternative embodiment, each sheet of polymeric material is constructed of cured rubber. In alternative embodiments, the sheet of polymeric material may be constructed of a foamed polymer, polyurethane, thermoplastics, resins, or other elastomeric or polymeric material. In another alternative embodiment, the sheet is formed of metal instead of a polymeric material. In one embodiment, each sheet is made of a uniform material. In an alternative embodiment, each sheet is constructed of a plurality of different materials. For example, the tread portion, upper ring, lower ring, and spokes may be constructed of different materials. Additionally, different sheets may be constructed of different materials. In any of the above embodiments, adhesive may be employed between sheets of material.

In one embodiment, each sheet of polymeric material is formed by an additive manufacturing method. For example, each sheet may be made by 3D printing, binder jetting, directed energy deposition, fused deposition modeling, laser sintering, material jetting, material extrusion, powder bed fusion, rapid prototyping, rapid tooling, sheet lamination, or vat photopolymerization. A jig or other fixture may be employed to aid in the assembly of multiple sheets to ensure proper orientation of each sheet. Alternatively, a jig or fixture may help define the shape of an individual sheet during the additive manufacturing process.

In an alternative embodiment, each sheet of polymeric material is formed by a subtractive manufacturing method. For example, the sheet of polymeric material may be cut (such as with a die, knife, or laser). Where a subtractive process is used, the sheet may be shaped before it is placed on top of the other sheets. Alternatively, the sheet may be only partially formed before it is placed on top of the other sheets, and then cut to its final shape after placement. Such a process would obviate the need for exactly placement of the sheet.

In another alternative embodiment, each sheet of polymeric material is formed by a molding process.

In one embodiment, each sheet of polymeric material 110 has a thickness of about 2 mm (0.080 inches). In alternative embodiments, each sheet of polymeric material may have a thickness between 0.02 mm to 25.4 mm (0.001 inches to 1 inch). In one embodiment, each sheet of polymeric material in the tire has substantially the same thickness. In alternative embodiments, the thickness of the sheets may vary. For example, thicker or thinner sheets may be used at different locations to change the spacing or placement of a reinforcement. It should be understood that in an additive manufacturing process, the sheets may not be visibly distinct from each other and thus they may not have a discernible thickness.

With continued reference to FIG. 1, the non-pneumatic tire 100 further includes a plurality of reinforcements 150, with each reinforcement 150 being disposed between adjacent sheets of polymeric material 110. In the illustrated embodiment, the reinforcement 150 is a plurality of cords forming a pair of upper rings 160, a lower ring 170, and a plurality of spoke reinforcements 180. The cords may also be referred to as wires or filaments. The upper rings 160 of the reinforcement 150 are sandwiched between the upper rings 120 of adjacent sheets of polymeric material 110. Likewise, the lower ring 170 of the reinforcement 150 is sandwiched between the lower rings 130 of adjacent sheets of polymeric material 110. Additionally, the spoke reinforcements 180 are sandwiched between the spoke portions 140 of adjacent sheets of polymeric material 110.

The pair of upper rings 160 of the reinforcement 150 are positioned such that when the tire 100 is cured, the upper rings 160 of the reinforcement 150 form a shear element defined by the upper pair of rings 120 of the sheets of polymeric material 110. In other words, a portion of the upper rings 120 of the polymeric material 110 is an elastic material disposed radially between the substantially inelastic membranes formed by the pair of upper rings 160 of the reinforcement 150.

However, it should be understood that the shape of the reinforcement 150 shown in FIG. 1 is merely exemplary. In alternative embodiments, some or all of the upper rings 160 of the reinforcement 150 may be omitted. Likewise, some or all of the lower rings 170 of the reinforcement 150 may be omitted. Additionally, some or all of the spoke reinforcements 180 may be omitted. In other alternative embodiments, multiple reinforcements may be employed on some portions. While the reinforcements are continuous components in the illustrated embodiment, it should be understood that the reinforcements may be discontinuous. For example, the reinforcements may be chopped fibers that are distributed along portions of a polymeric sheet.

The reinforcement 150 may be constructed of a material selected from the group consisting of steel, polyester, nylon, carbon fiber, aramid, fiber glass, cotton, hemp, polyurethane and other plastic, other synthetic or natural fibers, and other metal materials. While the reinforcement 150 is shown as a plurality of cords in FIG. 1, in alternative embodiments, the reinforcement is a mesh of material or a sheet of material. In another alternative embodiment, the reinforcement may be chopped fibers.

In one embodiment, the spoke reinforcements 180 are constructed of a material that shrinks in length by 0.1% to 10% when subjected to a temperature between 38° C. to 260° C. and a pressure between 0.10 mPa to 0.70 mPa. Polyester is one such material, but any material exhibiting such properties may be employed.

To construct the non-pneumatic tire 100, the method includes forming a first sheet of polymeric material 110 having a substantially circular shape. The first sheet of polymeric material 110 may be formed using any of the methods described above. The first sheet of polymeric material 110 may be formed on a flat surface, or it may be formed on a jig or fixture.

The method then includes placing a reinforcement 150 on the first sheet of polymeric material 110. In one embodiment, the reinforcement 150 has a preformed shape before it is placed on the first sheet of polymeric material 110. In an alternative embodiment, the reinforcement 150 may be shaped as it is being placed on the first sheet of polymeric material 110. For example, the reinforcement may be extruded or 3D printed onto the first sheet of polymeric material 110.

The method further includes placing a second sheet of polymeric material having a substantially circular shape on the first sheet of polymeric material, such that the reinforcement 150 is sandwiched between the first sheet of polymeric material and the second sheet of polymeric material. The method is then repeated, so that additional reinforcements and additional sheets of polymeric material are placed on top of each other until a tire is built having a predetermined width. In other words, the tire is built in a direction perpendicular to the axis of rotation of the tire, and the number of layers and their width determines the width of the tire. In one embodiment, the tire has a width of 190 mm (7.5 inches). In other embodiments, the tire has a width of 12.5 mm to 1525 mm (0.5 inches to 60 inches). A tire having a plurality of layers in the axial direction may be referred to as a composite layer tire.

In one embodiment, adhesive or cement may be applied to a sheet of polymeric material before or after the reinforcement is placed on it. Additionally, additives or chemical treatment may be selectively applied to the polymeric sheets or to the reinforcements during the build process. Further, some sheets of polymeric material may have a contoured surface or a roughened surface to promote adhesion. For example, a sheet of polymeric material may go through a roughening process after it is placed on the tire.

While FIG. 1 shows alternating layers of polymeric sheets and reinforcements, it should be understood that several layers of polymeric sheets may be placed together or several layers of reinforcements may be placed together. It should also be understood that the reinforcements may vary on different layers. For example, a lower ring reinforcement may be placed on a first sheet, a pair of upper ring reinforcements may be placed on a second sheet, and spoke reinforcements may be placed on a third sheet.

After the tire 100 is built, it is then cured. In one embodiment, the tire is cured in a vulcanization mold. When the tire is cured in a vulcanization mold, the outer surfaces of the tire may be further shaped during vulcanization. In an alternative embodiment, the tire is cured in an autoclave. An autoclave may cure the tire at lower pressures than a typical vulcanization mold, thereby allowing the tire to maintain its shape. In yet another embodiment, the tire may be cured between metal plates of other materials. In still another embodiment, the curing step may be omitted.

In one embodiment, the tire is cured at a temperature between 38° C. to 260° C. and a pressure between 0.10 mPa to 0.70 mPa. Under these conditions, the spoke reinforcements 180 shrink in length by 0.1% to 10%. In one known embodiment, the polymeric sheet does not shrink. In another known embodiment, the polymeric sheet shrinks at a different rate from the spoke reinforcements 180.

The shrinkage of the spoke reinforcements 180 creates tension on the spokes 140, so that the spokes are under tension when a tread portion of the tire 100 is not in contact with a ground surface. When the tire 100 is in contact with the ground surface and in a loaded condition (i.e., bearing a portion of the weight of a vehicle), at least some of the spokes 140 below an axis of the tire may be in compression and at least some of the spokes 140 above the axis may be in tension. In one embodiment, each spoke 140 carries a load while in compression and also while in tension. The load carried under compression may be much smaller than the load carried in compression. In an alternative embodiment, each spoke only carries a load while in tension. In one embodiment, the spokes are stiffer in tension than in compression.

The spokes 140 may buckle under compression, depending on the size of the load, the material and geometry of the spokes, and other factors. If buckling occurs, the spokes 140 may not carry a load.

Many variations of composite layer tires are possible. For example, the type of material used as reinforcement may be selected to optimize the weight, stiffness, and other characteristics of the tire. Likewise, the amount and location of the reinforcement may also be selected to optimize characteristics of the tire. Examples of various composite layer tires are shown in FIGS. 2-12 and described below. It should be understood that these examples are not meant to be limiting and that further modifications may be made to enhance selected characteristics of the tire. It should also be understood that in each of the embodiments shown, the spoke reinforcements may be constructed of a material that shrinks in length by 0.1% to 10% when subjected to a temperature between 38° C. to 260° C. and a pressure between 0.10 mPa to 0.70 mPa. Such shrinkage creates tension on the spokes, so that the spokes are under tension when a tread portion of the tire is not in contact with a ground surface.

Figure 2:
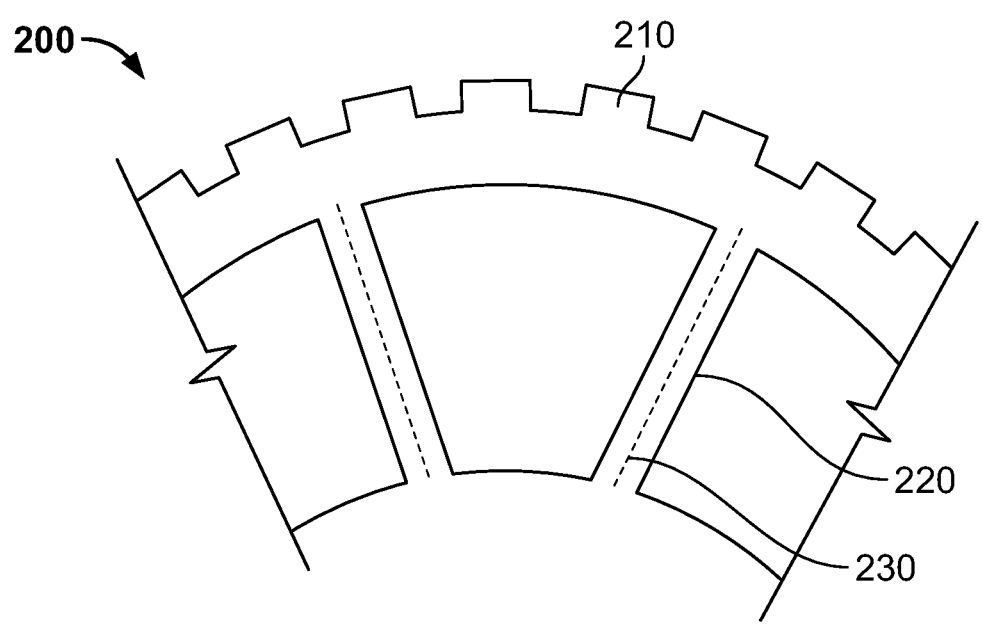
FIG. 2 illustrates a partial side cross-sectional view of an alternative embodiment of a non-pneumatic tire.

FIG. 2 illustrates a partial side cross-sectional view of one embodiment of a partially assembled, composite layer, non-pneumatic tire 200. The tire 200 includes a tread portion 210 and a plurality of spokes 220. Each spoke 220 includes a reinforcement 230 extending in a radial direction. In the illustrated embodiment, a single reinforcement cord 230 is placed on each spoke portion of a sheet of polymeric material. During the building process, cords may be placed in the same location on each layer, such that the cords define a reinforcement plane extending in an axial direction for each spoke. Alternatively, the cords may be placed in different locations on different layers to form a non-planar reinforcement or to form reinforcements extending axially in a selected pattern.

The single cord reinforcement 230 in each spoke 220 provides additional stiffness in tension. This may be advantageous in non-pneumatic tires that are designed to carry some or all of a load in tension.

Figure 3A:
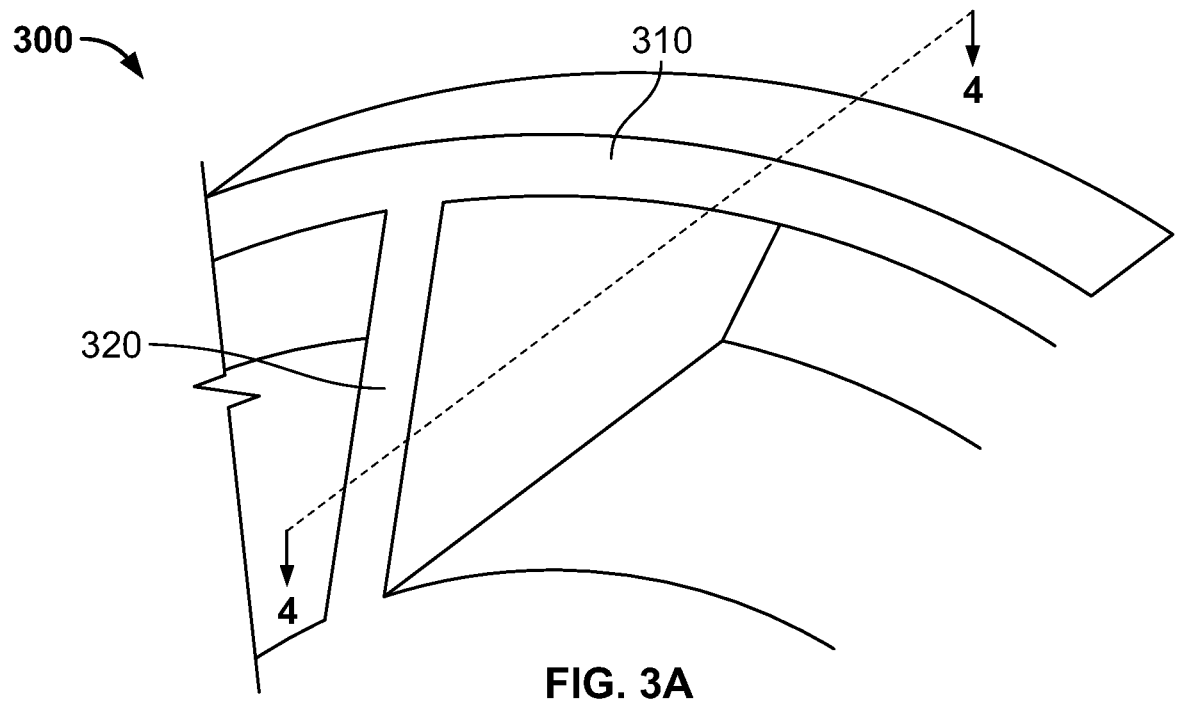
FIG. 3A illustrates a partial perspective view of one embodiment of a non-pneumatic tire 300.

FIG. 3A illustrates a partial perspective view of an alternative embodiment of a non-pneumatic tire 300. The tire 300 includes a tread portion 310 and a plurality of spokes 320.

Figure 3B:
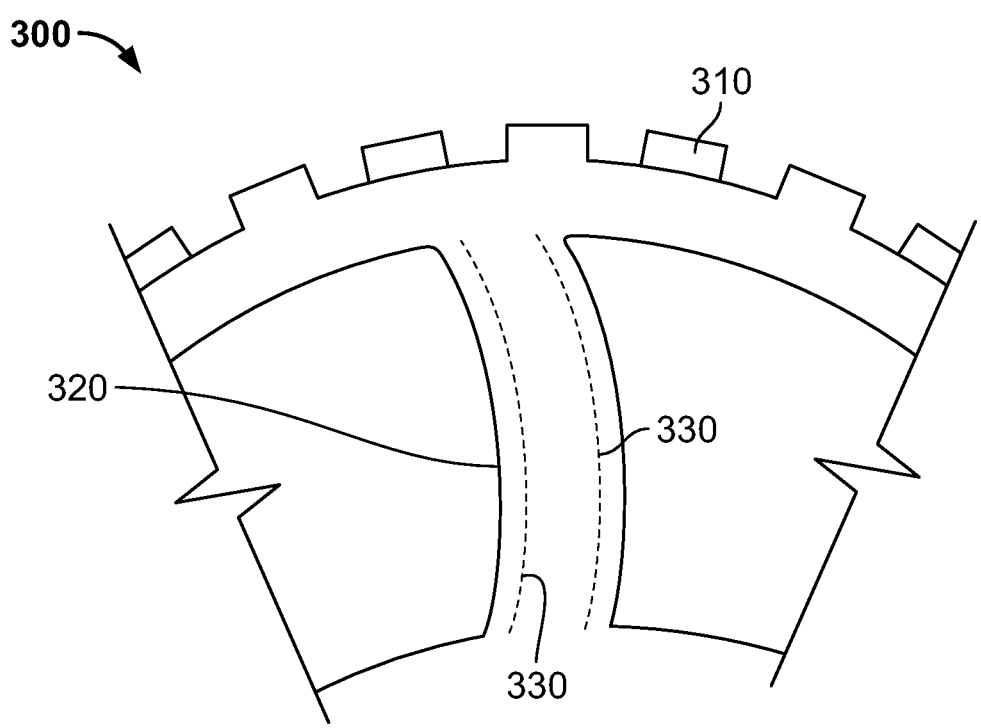
FIG. 3B illustrates a partial side cross-sectional view of the tire 300.

FIG. 3B illustrates a partial side cross-sectional view of the non-pneumatic tire 300. In the illustrated embodiment, the spokes 320 are shown as bending under compression, but are straight when no force is present. In an alternative embodiment, the spokes are curved when no force is present.

Each spoke 320 includes a pair of reinforcements 330 extending in a substantially radial direction. In the illustrated embodiment, a pair of reinforcement cords 330 is placed on each spoke portion of a sheet of polymeric material. Cords may be placed in the same location for each layer, such that the cords define a pair of reinforcement planes extending in an axial direction for each spoke. Alternatively, the cords may be placed in different locations on different layers to form a non-planar reinforcement or to form reinforcements extending axially in a selected pattern. Examples of several such embodiments are shown in FIGS. 4A-4D, each of which shows a radial cross-section of a spoke 320, looking downwards towards the center of the tire in a radial direction.

Figure 4A:
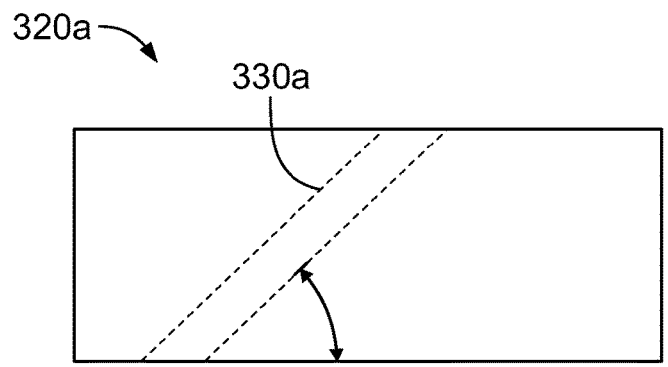
FIGS. 4A-4D illustrate radial cross-sectional views of spokes of alternative embodiments of the tire 500.

FIG. 4A illustrates a radial cross-sectional view of one embodiment of a spoke 320a. In the illustrated embodiment, a pair of reinforcements 330a is disposed on each sheet of polymeric material. After placing a new sheet of polymeric material during the tire build, the next pair of reinforcements 330a is placed at a location that is offset circumferentially from the previous pair of reinforcements 330a. The resulting reinforcements 330a are distributed in a diagonal direction across the width of the spoke 320a from one side of the tire to the other.

Figure 4B:
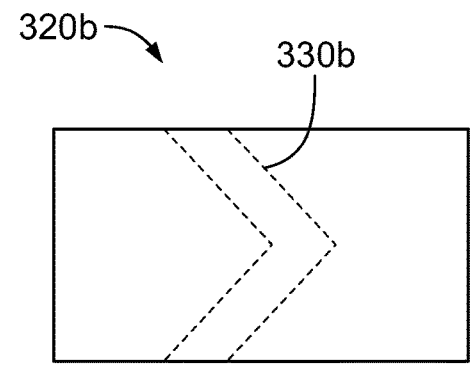

FIG. 4B illustrates a radial cross-sectional view of an alternative embodiment of a spoke 320b. In the illustrated embodiment, a pair of reinforcements 330b is disposed on each sheet of polymeric material. After placing a new sheet of polymeric material during the tire build, the next pair of reinforcements 330b is placed at a location that is offset circumferentially from the previous pair of reinforcements 330b. The reinforcements 330c are offset in a first direction on a first half of the tire, and then offset in an opposite direction on the second half of the tire. The resulting reinforcements 330b are distributed in a V-shape across the width of the spoke 320b from one side of the tire to the other.

Figure 4C:
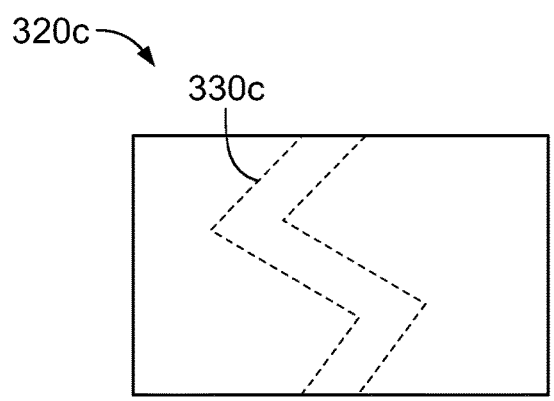

FIG. 4C illustrates a radial cross-sectional view of an alternative embodiment of a spoke 320c. In the illustrated embodiment, a pair of reinforcements 330c is disposed on each sheet of polymeric material. After placing a new sheet of polymeric material during the tire build, the next pair of reinforcements 330c is placed at a location that is offset circumferentially from the previous pair of reinforcements 330c. The reinforcements 330c are offset in a first direction for a first portion of the tire, then offset in an opposite direction for a second portion of the tire. The direction of the reinforcements 330c continues to alternate, resulting in a zig-zag distribution across the width of the spoke 320c from one side of the tire to the other.

Figure 4D:
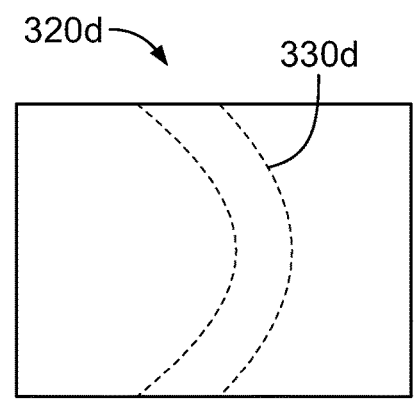

FIG. 4D illustrates a radial cross-sectional view of yet another alternative embodiment of a spoke 320d. In the illustrated embodiment, a pair of reinforcements 330d is disposed on each sheet of polymeric material. After placing a new sheet of polymeric material during the tire build, the next pair of reinforcements 330d is placed at a location that is offset circumferentially from the previous pair of reinforcements 330d. The reinforcements 330d are offset in a first direction on a first half of the tire, and then offset in an opposite direction on the second half of the tire, with the offset gradually changing. The resulting reinforcements 330d are distributed in a curved formation across the width of the spoke 320d from one side of the tire to the other.

In each of the embodiments shown in FIGS. 4A-4D, equal spacing is maintained between the pair of reinforcements 330 on each layer. In alternative embodiments (not shown), the spacing may change on different layers.

In each of the embodiments shown and described in FIGS. 3-4, the pair of reinforcements 330 in each spoke 320 acts as a shear beam. In other words, when the spoke 330 bends, one of the reinforcements is placed in compression and the other reinforcement is placed in tension. Such an arrangement provides additional stiffness in the spokes in both tension and compression. This may be advantageous in non-pneumatic tires that are designed to carry some or all of a load in tension, as well as in non-pneumatic tires that are designed to carry some or all of a load in compression. However, it should be understood that in alternative embodiments a single reinforcement layer may be arranged in the orientations shown in FIGS. 4A-4D.

Figure 5:
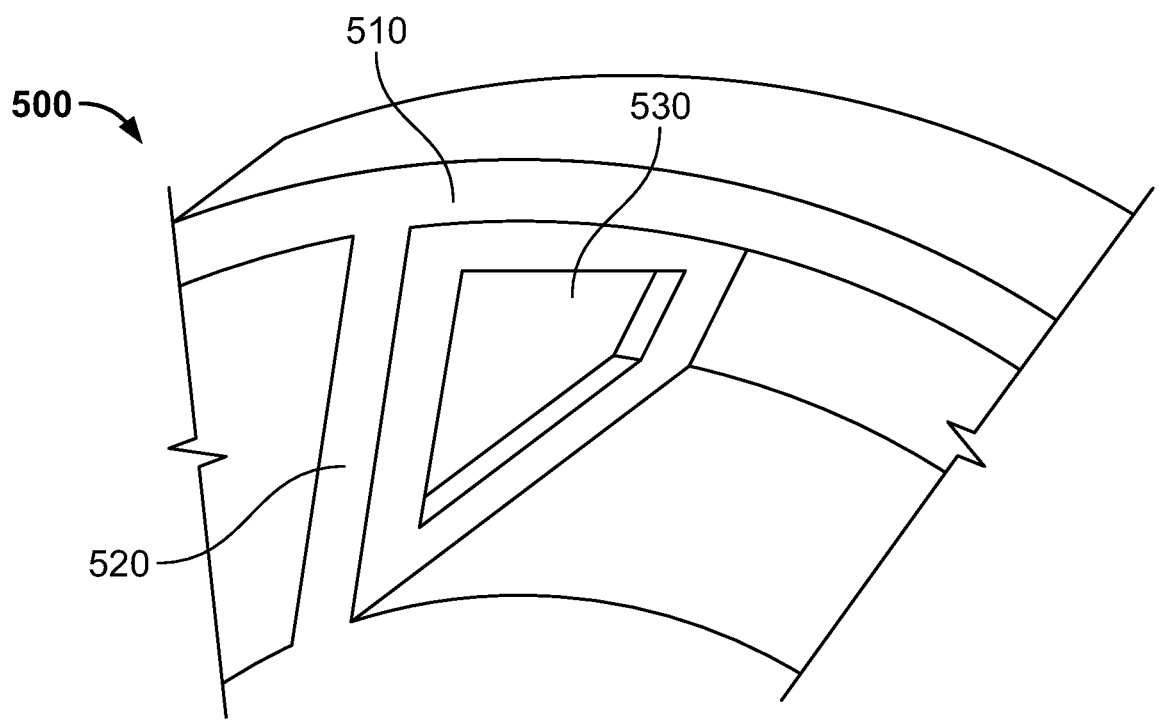
FIG. 5 illustrates a partial perspective view of an alternative embodiment of a non-pneumatic tire.

FIG. 5 illustrates a partial perspective view of another alternative embodiment of a non-pneumatic tire 500. The tire 500 includes a tread portion 510 and a plurality of spokes 520. In this embodiment, the spokes 520 are not solid, but instead have an opening 530. In the illustrated embodiment, the opening 530 is substantially rectangular. In alternative embodiments (not shown), the openings may be triangular, pentagonal, hexagonal, octagonal, circular, oval, or have any geometric shape.

When a tire is cured at high temperatures and pressures, the green rubber may flow during the curing process. However, if the tire is cured at lower temperatures or lower pressures, the openings 530 may maintain their shape during the curing process. For example, the tire may be cured in an autoclave at a lower pressure than would be provided during a curing process in a tire vulcanization mold. In one embodiment, the tire is cured at a temperature between 38° C. to 260° C. (100° F. to 500° F.) and at a pressure between 0.10 mPa to 0.70 mPa (15 PSI to 100 PSI). However, it should be understood that the tire may be cured at other temperatures and pressures.

Figure 6:
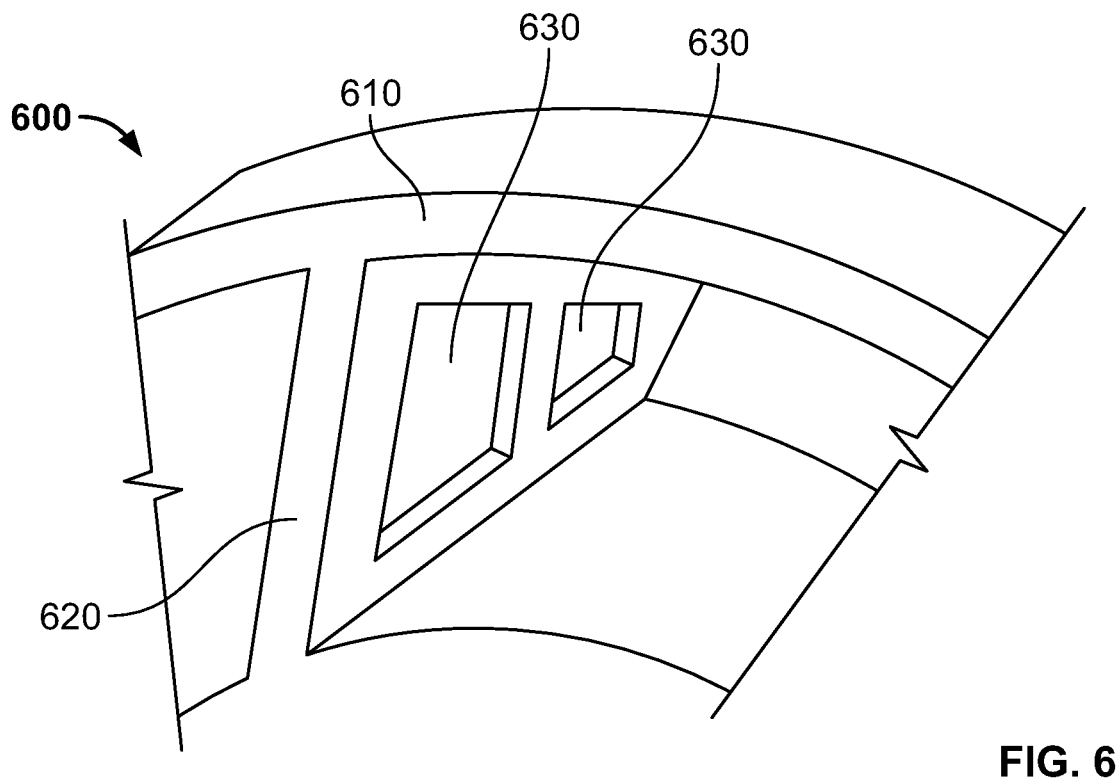
FIG. 6 illustrates a partial perspective view of another alternative embodiment of a non-pneumatic tire.

FIG. 6 illustrates a partial perspective view of another alternative embodiment of a composite layer, non-pneumatic tire 600. The tire 600 includes a tread portion 610 and a plurality of spokes 620. In this embodiment, the spokes 620 are not solid, but instead have a pair of opening 630. In the illustrated embodiment, the openings 630 are substantially rectangular. In alternative embodiments (not shown), the openings may be triangular, pentagonal, hexagonal, octagonal, circular, oval, or have any geometric shape. While two openings are shown on each spoke, it should be understood that any number of openings may be employed.

In the embodiments shown in FIGS. 5 and 6, the openings in the spokes may reduce the weight of the tire. The openings also allow air to flow around the tire in a manner different from tires having solid spokes. The size and location of the openings may be selected to control the air flow in a desired manner to reduce noise, cool the tires, enhance performance, or for other reasons. In other embodiments, the size and location of the openings may be selected to control the air flow in a desired manner to increase noise. For example, in a spare tire or other low-use tire, an increased noise may discourage a person from using the tire for an extended period of time. As another example, the size and location of the openings in the spokes may be selected to produce more noise when the tires are used at excessive speeds.

Figure 7A:
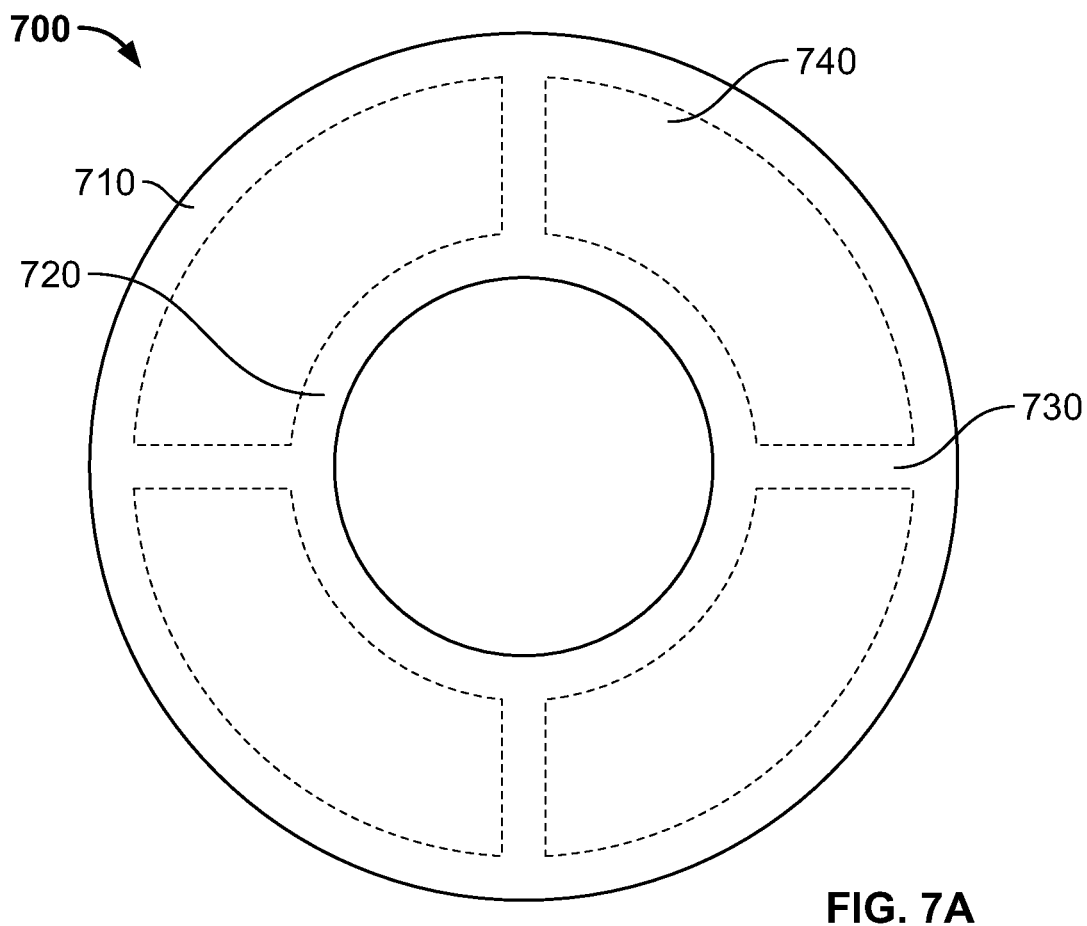
FIG. 7A illustrates a side view of yet another alternative embodiment of a non-pneumatic tire 700.
Figure 7B:
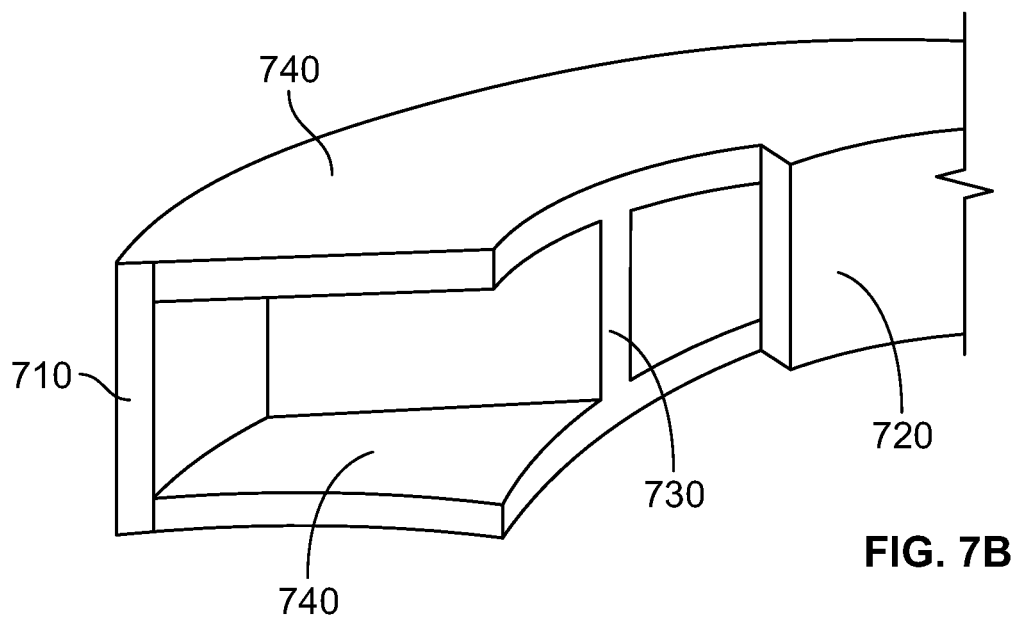
FIG. 7B illustrates a partial cutaway perspective view of the non-pneumatic tire 700.

FIG. 7A illustrates a side view of yet another alternative embodiment of a non-pneumatic tire 700. Additionally, FIG. 7B illustrates a partial cutaway perspective view of the non-pneumatic tire 700. The tire 700 includes an upper ring 710, a lower ring 720, and a plurality of spokes 730 extending between the upper ring 710 and the lower ring 720. In the illustrated embodiment, the tire 700 further includes sidewalls 740 (or covers) on the outer ends. The sidewalls 740 may be constructed of the same material as the other components of the tire 700. Alternatively, the sidewalls may be constructed of a different material. In one embodiment, the sidewalls 740 are constructed of a transparent material. The sidewalls may protect the spokes 730 and other elements of the tire 700 from damage by debris and may also keep the tire components clean from dust and dirt. Such solid layers could also be used at other axial locations on the tire to control the stiffness of the tire.

While reinforcements are not expressly shown in the tire 700 in FIGS. 7A and 7B, it should be understood that reinforcements may be employed in the manner described above. For example, any of the upper ring 710, lower ring 720, and spokes 730 may include one or more reinforcements.

Figure 8:
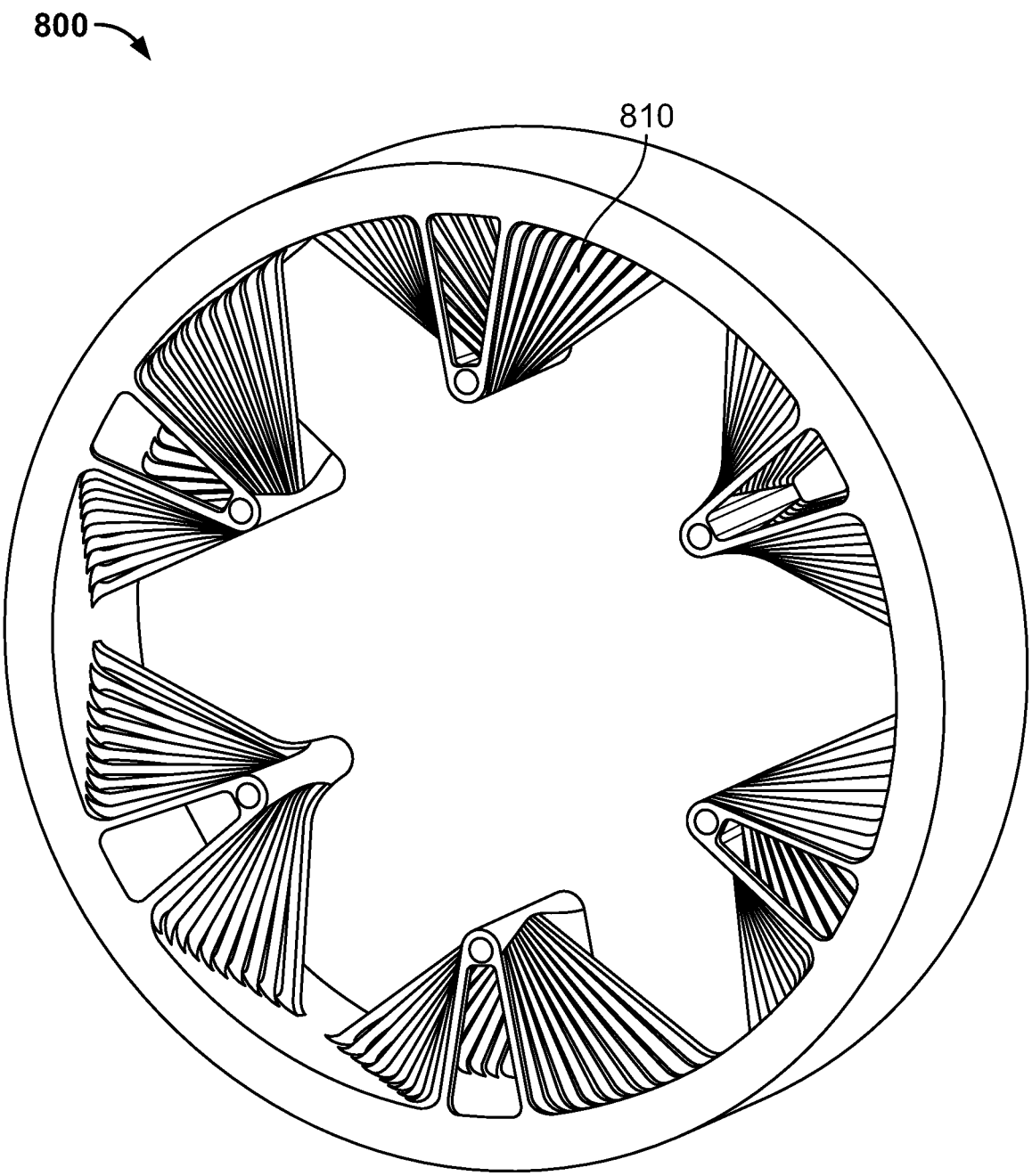
FIG. 8 illustrates a perspective view of still another alternative embodiment of a non-pneumatic tire 800.
Figure 9:
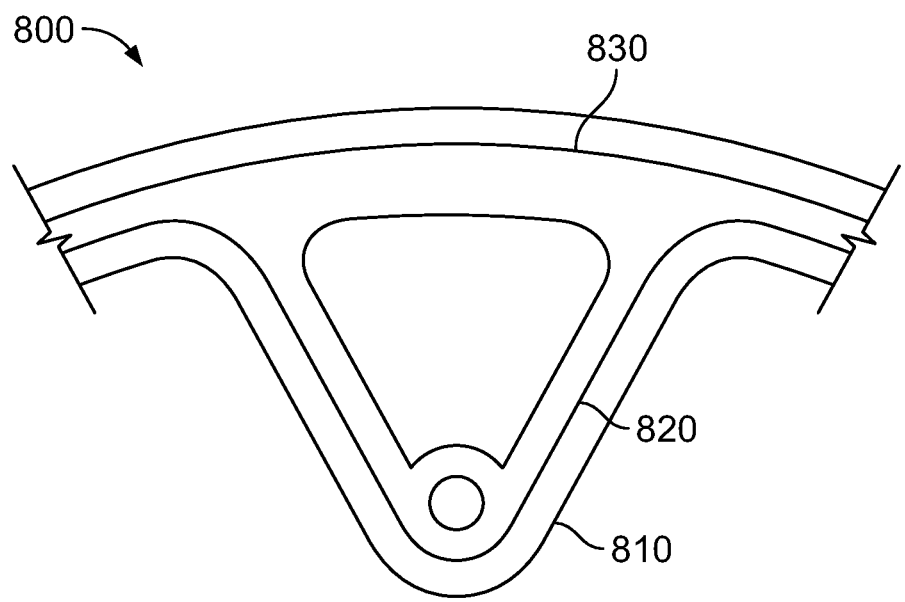
FIG. 9 illustrates a partial side cross-sectional view of the non-pneumatic tire 800.

FIG. 8 illustrates a perspective view of still another alternative embodiment of non-pneumatic tire 800. The tire 800 is an example of a tire having changing cross-sections. The tire includes spokes 810 that extend at varying angles at different axial locations along the tire. FIG. 9 shows a partial cross-section of the tire 800. In this embodiment, the tire 800 includes reinforcements 820 that extend along the outer diameter of the tire and separate reinforcements 830 that extend along the spokes 810. In alternative embodiments, the reinforcements may be varied as desired. For example, any of the reinforcement configurations shown in FIGS. 1-7 may be employed.

It should be understood that the tire 800 is merely exemplary, and that the method of making a composite layer tire may be employed to vary the thickness and shape of spokes or webbing at different axial locations on the tire.

Figure 10A:
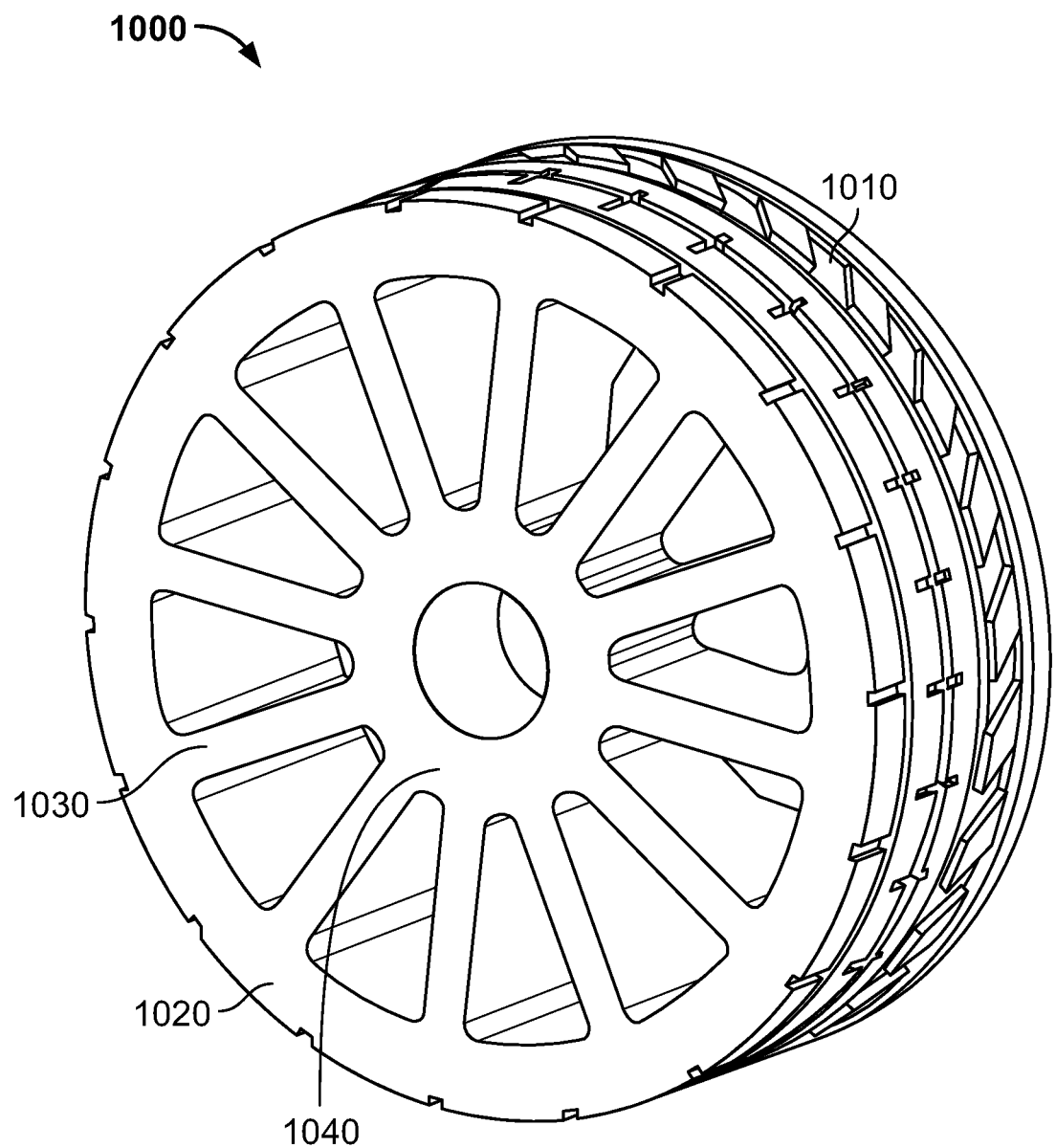
FIGS. 10A-10B illustrate first and second perspective views of yet another embodiment of a non-pneumatic tire.
Figure 10B:
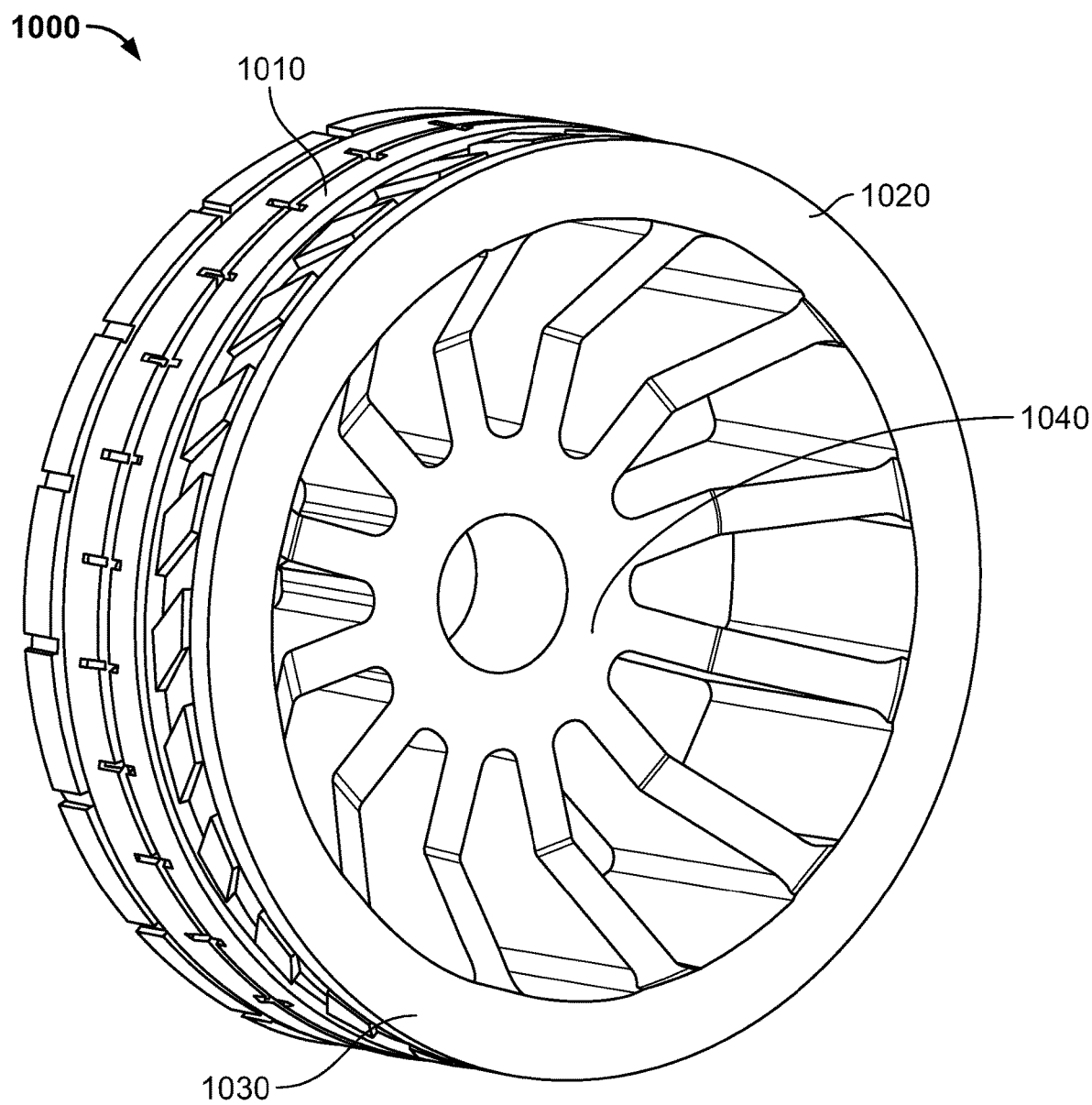

FIGS. 10A-10B illustrate first and second perspective views of yet another embodiment of a non-pneumatic tire 1000. The tire 1000 includes a tread 1010 disposed on an outer ring 1020. The tire 1000 further includes a plurality of spokes 1030 extending from the outer ring 1020 to an inner ring 1040. On the first side of the tire, shown in FIG. 10A, the tread 1010, outer ring 1020, spokes 1030, and inner ring 1040 each extend to the outer boundary of the first side. On the second side of the tire, shown in FIG. 10B, only the tread 1010 and outer ring 1020 extend to the outer boundary of the second side. The inner ring 1040 and lower portions of the spokes 1030 terminate at a first location, while upper portions of the spokes 1030 extend at an angle towards the outer boundary of the second side.

To produce the tire 1000 using a composite layer process, certain sheets of material (i.e., those sheets proximate to the first side of the tire) would include an outer ring portion, spoke portions, and an inner ring portion. Certain sheets closer to the second side of the tire would include outer ring portions and partial spoke portions, but no inner ring portion. Certain sheets proximate to the second side of the tire would include an outer ring portion, but no spoke portions or inner ring portion.

While FIGS. 10A and 10B do not show reinforcements in the tire 1000, it should be understood that reinforcements may be included in any region of the tire. Additionally, in an alternative embodiment, a reinforcement may be present in regions of the tire where green rubber (or other polymeric material) is absent. For example, one or more spoke portions may be absent from sheets of polymeric material during the building of a tire, such that the spokes of the resulting tire consist of bare cords of reinforcement material.

Figure 11:
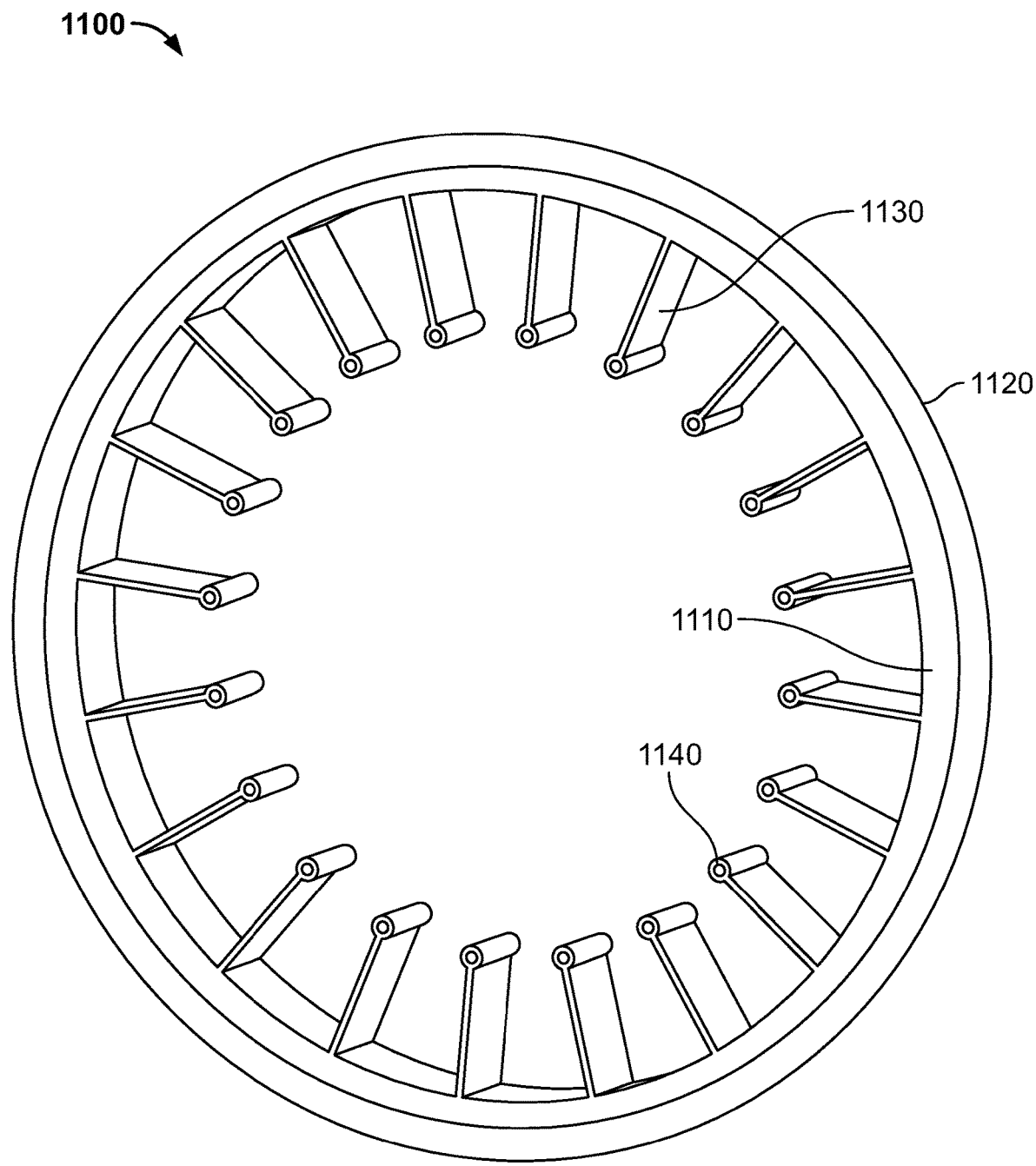
FIG. 11 illustrates a front view of another alternative embodiment of a non-pneumatic tire.

FIG. 11 is a front view of one embodiment of a non-pneumatic tire 1100. The non-pneumatic tire 100 includes an outer annular band 1110 with a tread 1120 disposed circumferentially thereon. A plurality of spokes 1130 extend inwardly from the outer annular band 1110. In the illustrated embodiment, each spoke 1130 extends axially below the entire outer annular band 1110. In an alternative embodiment, each spoke extends only partially below the outer annular band. In one such embodiment, two or more rows of spokes may be employed. The rows may be aligned with each other or offset from each other.

Each spoke 1130 terminates at a lower end having a spoke mount 1140. The spoke mounts 1140 are mounting points disposed along an inner diameter of the tire 1100. In the illustrated embodiment, each spoke mount 1140 is a circular aperture that can receive a fastener such as a pin, a post, a tab, or a threaded rod. The circular aperture may be smooth or it may be threaded. In an alternative embodiment (not shown), the spoke mount is a slot. In another alternative embodiment (not shown) the spoke mount is a projection, such as a pin, a post, a tab, or a threaded rod.

In the illustrated embodiment, the outer annular band 1110 and the spokes 1130 are part of a unitary component constructed of a single material. For example, the outer annular band 1110 and the spokes 1130 may be constructed of a polymeric material, such as polyurethane, polyester, or thermoplastic. The outer band and the spokes may also be constructed of one or more resins, or a metal, such as steel. In such embodiments, the outer annular band 1110 and the spokes 1130 may be constructed as a single, unitary component through a casting, molding, or additive manufacturing process.

In an alternative embodiment, the outer annular band 1110 and the spokes 1130 are separate components constructed of different materials. In one known embodiment, the outer annular band 1110 is constructed of a polymeric material, such as polyurethane, polyester, or thermoplastic. The outer annular band 1110 may also be constructed of resin or a metal, such as steel. In one embodiment, the spokes 1130 are constructed of a polymeric material, such as polyurethane, and the outer annular band is constructed of a resilient material, such as rubber. The outer annular band 1110 and the spokes 1130 may also include embedded reinforcements.

In the illustrated embodiment, the tread 1120 is a separate rubber component disposed about the outer annular band 1110. The tread 1120 may include ribs, blocks, grooves, sipes, or other tread elements (not shown). The tread 1120 may be affixed to the outer annular band 1110 with an adhesive. Alternatively, the tread 1120 may be affixed to the outer annular band 1110 through a curing process or a chemical bonding process.

In an alternative embodiment (not shown) the outer annular band itself forms the tread of tire. As such, it may include ribs, blocks, grooves, sipes, or other tread elements (not shown).

Figure 12:
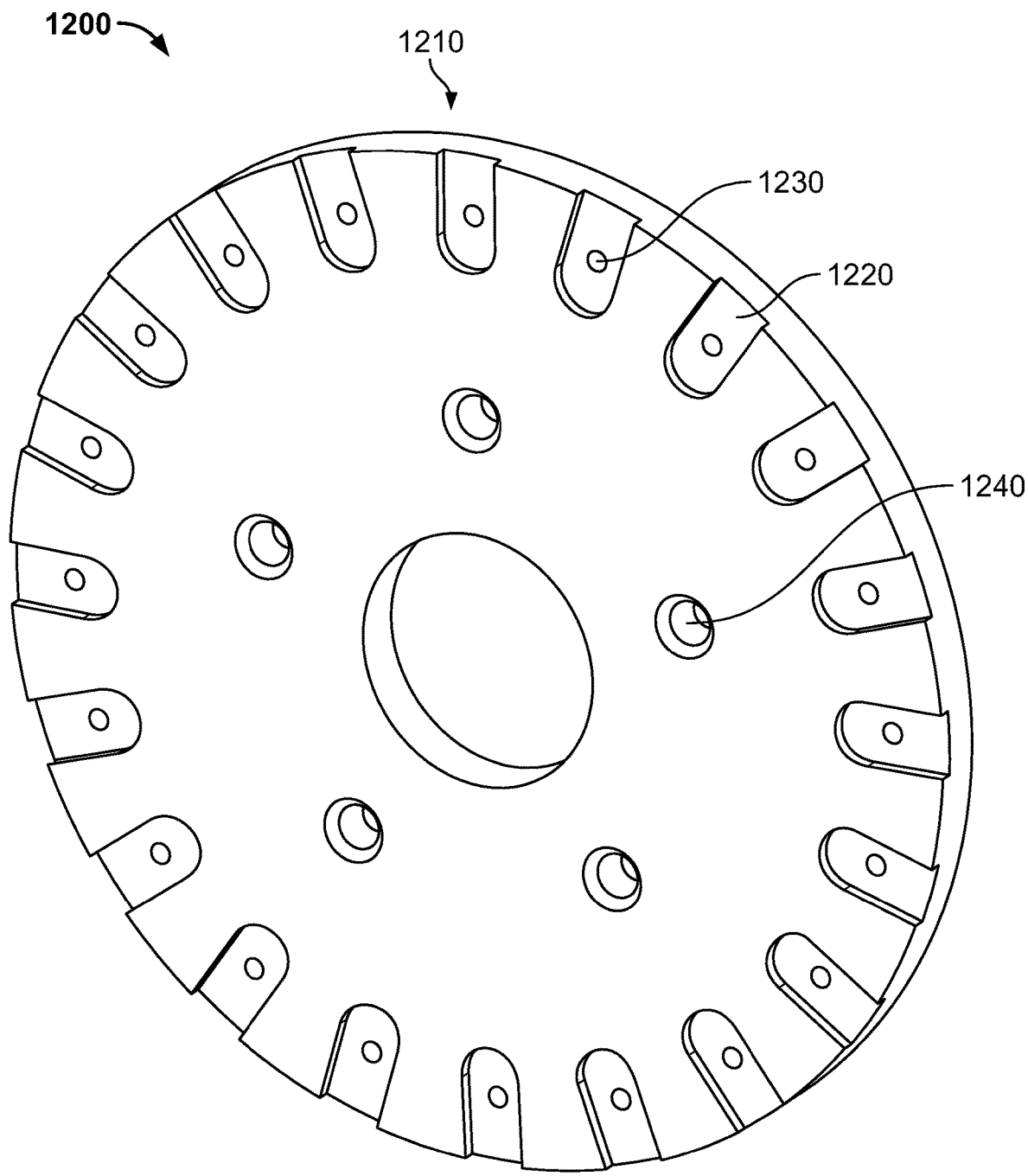
FIG. 12 illustrates a front view of one embodiment of a hub.

FIG. 12 is a front view of one embodiment of a hub 1200 having a plurality of hub mounts 1210 disposed near an outer diameter of the hub. Each hub mount 1210 corresponds to a spoke mount 1140 of the non-pneumatic tire 1100. In the illustrated embodiment, the each hub mount 1210 includes a recessed portion 1220 having a stilted arch shape. In an alternative embodiment (not shown), the recessed portion may be omitted.

Each hub mount 1210 further includes a circular aperture 1230 that can receive a fastener such as a pin, a post, a tab, or a threaded rod. The circular apertures 230 are disposed in a circular arrangement. The circular apertures may be smooth or threaded. In an alternative embodiment (not shown), the hub mount includes a slot instead of a circular aperture. In another alternative embodiment (not shown) the spoke mount is a projection, such as a pin, a post, a tab, or a threaded rod.

Each hub mount 1210 is configured to be connected to a corresponding spoke mount 1140 of the non-pneumatic tire 1100. As explained above, the spokes 1130 may have internal reinforcements (not shown) that shrink during a curing process. Thus, each spoke 1130 is under tension when the tread 1120 of the tire 1100 is not in contact with a ground surface and when each spoke mount 1140 is engaged with its corresponding hub mount 1210. Additionally, at least some of the plurality of spokes 1130 are under tension when the tread 1120 is in contact with the ground surface and when each spoke mount is engaged with its corresponding hub mount 1210.

The hub 1200 further includes a plurality of wheel mounts 1240 configured to receive fasteners to affix the hub to a wheel. While the illustrated embodiment shows a large central aperture and five smaller apertures, it should be understood that any mounting configuration may be employed.

In one known embodiment, the hub 1200 is constructed of a polymeric material, such as polyurethane, polyester, or thermoplastic. The hub 1200 may also be constructed of resin or a metal, such as steel.

In alternative embodiments, electronics may be embedded into layers of the tire. For example, an RFID may be embedded in the tire. A conductive filament or material could be run through spokes or around other portions of the tire to allow for the detection of damage to the tire. For example, if a spoke is torn there would no longer be a conductive path and this could be sensed by the electronics in the tire. Conductive filaments may also be embedded in certain portions of the tire to aid in the discharge of static electricity that may build up as the tire rotates.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

What is claimed is:

1. A nonpneumatic tire comprising:
    a plurality of rubber layers having a substantially circular shape,
        wherein each rubber layer includes an upper ring defining a tread portion, and
        wherein each rubber layer further includes a plurality of spoke portions extending from the upper ring; and
    a plurality of elongated reinforcements extending in a substantially radial direction, each reinforcement being disposed between the spoke portions of adjacent rubber layers,
        wherein each reinforcement is constructed of a material that shrinks in length by 0.1% to 10% when subjected to a temperature between 38° C. to 260° C. and a pressure between 0.10 mPa to 0.70 mPa, and wherein each spoke portion is under tension when the tread portion is not in contact with a ground surface.

2. The nonpneumatic tire of claim 1, wherein each spoke terminates at a lower end having a spoke mount configured to engage a corresponding hub mount.

3. The nonpneumatic tire of claim 2, wherein at least some of the plurality of spoke portions are under tension when the tread portion is in contact with a ground surface and when each spoke mount is engaged with its corresponding hub mount.

4. The nonpneumatic tire of claim 1, wherein each spoke extends between the upper ring and a lower ring.

5. The nonpneumatic tire of claim 1, wherein each reinforcement is constructed of polyester.

6. The nonpneumatic tire of claim 1, further comprising an electronic device embedded in the tire and a conductive filament connected to the electronic device and disposed in at least one spoke portion.

7. A nonpneumatic tire and hub assembly comprising:
a hub; and
a tire including:
an upper ring,
a tread disposed about the upper ring;
a plurality of spokes extending between the upper ring and the hub, and
at least one reinforcement embedded in each spoke, wherein each reinforcement is constructed of a material that shrinks in length by 0.1% to 10% when subjected to a temperature between 38° C. to 260° C. and a pressure between 0.10 mPa to 0.70 mPa, and wherein each spoke is under tension when the tread is not in contact with a ground surface.

8. The assembly of claim 7, wherein the hub includes a plurality of hub mounts and each spoke includes a spoke mount that is mounted to one of the hub mounts.

9. The assembly of claim 7, wherein the tire is constructed of a plurality of rubber layers.

10. The assembly of claim 9, wherein each reinforcement is disposed between two of the rubber layers.

11. The assembly of claim 9, wherein each rubber layer is constructed of the same material.

12. The assembly of claim 7, wherein the reinforcements are polyester cords.

13. The assembly of claim 7, wherein at least one of the plurality of spokes has an opening disposed therein.

14. A nonpneumatic tire comprising:
an upper ring;
a tread disposed about the upper ring;
a plurality of spokes extending from the upper ring; and
at least one reinforcement embedded in each spoke, wherein each reinforcement is constructed of a material that shrinks in length by 0.1% to 10% when subjected to a temperature between 38° C. to 260° C. and a pressure between 0.10 mPa to 0.70 mPa, and wherein each spoke is under tension when the tread is not in contact with a ground surface.

15. The nonpneumatic tire of claim 14, wherein the at least one reinforcement is a radially extending polyester cord.

16. The nonpneumatic tire of claim 14, wherein each of the spokes extends in a substantially radial direction.

17. The nonpneumatic tire of claim 14, further comprising a lower ring.

18. The nonpneumatic tire of claim 17, wherein the spokes extend from the upper ring to the lower ring.

19. The nonpneumatic tire of claim 14, wherein each of the plurality of spokes has a mounting portion.

20. The nonpneumatic tire of claim 14, further comprising at least one sidewall connected to the upper ring.

* * * * *